US006645114B1

(12) United States Patent
Biallas

(10) Patent No.: US 6,645,114 B1
(45) Date of Patent: Nov. 11, 2003

(54) MULTIPLE AXES PLANETARY TRANSMISSION

(75) Inventor: Jeffrey J. Biallas, Dexter, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/125,957

(22) Filed: Apr. 19, 2002

(51) Int. Cl.$^7$ ................................................. F16H 3/44
(52) U.S. Cl. ........................ 475/271; 475/302; 475/303
(58) Field of Search .......................... 475/269, 271, 475/302, 303, 330

(56) References Cited

U.S. PATENT DOCUMENTS

| | | | | |
|---|---|---|---|---|
| 2,441,712 A | * | 5/1948 | McFarland | 475/302 |
| 2,506,399 A | * | 5/1950 | Vincent | 475/302 |
| 2,981,126 A | * | 4/1961 | Kelley | 475/303 |
| 3,798,999 A | * | 3/1974 | Fritsch | 74/674 |
| 4,468,980 A | * | 9/1984 | Johansen | 74/705 |
| 4,774,856 A | * | 10/1988 | Hiraiwa | 74/763 |
| 6,044,719 A | | 4/2000 | Reed, Jr. et al. | 74/330 |
| 6,286,381 B1 | | 9/2001 | Reed, Jr. et al. | 74/336 R |

* cited by examiner

Primary Examiner—Dirk Wright
(74) Attorney, Agent, or Firm—Leslie C. Hodges

(57) ABSTRACT

A transmission arrangement for a vehicle includes a transmission housing with at least two transmission axes extending therein. Each axis includes an input transfer gear engaged with an input clutch, wherein the input clutch is connected to at least one member of a planetary gear set. Each axis also includes an output transfer gear driven by a member of the planetary gear set. A synchronizer-type coupling element is operatively connected on each axis between the input clutch and the planetary gear set for selectively engaging and disengaging members of the planetary gear set with respect to the input clutch and transmission housing.

20 Claims, 3 Drawing Sheets

| GEAR STATE | GEAR RATIO | RATIO STEP |
|---|---|---|
| REVERSE | 3.313 | |
| NEUTRAL | --- | 0.733 |
| 1ST | 4.518 | |
| 2ND | 2.500 | 1.807 |
| 3RD | 1.667 | 1.500 |
| 4TH | 1.205 | 1.383 |
| 5TH | 1.000 | 1.205 |
| 6TH | 0.833 | 1.200 |

Fig. 3a

| GEAR STATE | GEAR RATIO | RATIO STEP |
|---|---|---|
| REVERSE | 3.200 | |
| NEUTRAL | --- | 0.762 |
| 1ST | 4.200 | |
| 2ND | 2.500 | 1.680 |
| 3RD | 1.563 | 1.600 |
| 4TH | 1.000 | 1.563 |
| 5TH | 0.833 | 1.200 |
| 6TH | 0.694 | 1.200 |

Fig. 3b

MULTIPLE AXES PLANETARY TRANSMISSION

TECHNICAL FIELD

The present invention relates to a multiple axes planetary transmission wherein each axis includes a synchronizer operatively connected between an input clutch and a planetary gear set for speed shifting.

BACKGROUND OF THE INVENTION

Vehicle transmissions for use in conventional automobiles are typically manual- or automatic-type transmissions. Manual transmissions include a clutch pedal and a gear shift lever which must be coordinated by a driver in order to select the desired speed. Automatic transmissions eliminate the need for a clutch pedal because all speed shifting is achieved automatically within the transmission. This is accomplished by means of a torque converter which provides a smooth coupling between the engine and the transmission, and hydraulically-actuated clutches which control shifting of planetary gear members.

Parasitic losses in the torque converter and power usage in the pressurization of hydraulic fluid for clutch shifting generally results in lower fuel efficiency for automatic transmission vehicles in comparison to manual transmission vehicles. The development of electronic control systems has improved the shifting schedule and shift feel of automatic transmissions, and has eased the implementation of fourth and fifth overdrive gears, thereby increasing fuel economy.

Recently, manual layshaft-type transmissions have been provided with automated shifting operation in the so-called dual input automated manual layshaft-type transmissions. Examples of these configurations are shown in U.S. Pat. Nos. 6,044,719 and 6,286,381.

SUMMARY OF THE INVENTION

The present invention provides a new automatic or manual planetary transmission arrangement which includes two or more axes within a transmission housing. Each axis includes an input friction energy absorbing clutch, a single planetary gear set, and a synchronizer-type coupling element.

More specifically, the invention provides a transmission arrangement for a vehicle, including a transmission housing with at least two transmission axes extending within the transmission housing. Each of the axes includes an input transfer gear engaged with an input clutch, wherein the input clutch is connected to at least one member of a planetary gear set. Each axis also includes an output transfer gear driven by a member of the planetary gear set, and a synchronizer-type coupling element operatively connected between the input clutch and the planetary gear set for selectively engaging and disengaging members of the planetary gear set with respect to the input clutch and transmission housing.

Preferably, one of the transmission axes includes a reverse speed synchronizer operatively connected between the respective planetary gear sets and output transfer gear for selectively reversing rotation of the respective output transfer gear.

The transmission arrangement of the invention may be used for a manual or automatic transmission. The transmission arrangement may be a four-speed transmission having two transmission axes, a six-speed transmission having three transmission axes, or an eight-speed transmission having four transmission axes, and so on.

In one embodiment, a six-speed transmission has three transmission axes. A first axis has components configured to provide second and fifth forward speed ratios. A second axis has components configured to provide reverse, first and fourth forward speed ratios. A third axis has components configured to provide third and sixth forward speed ratios.

Each synchronizer-type coupling element is configured to selectively connect one of the planetary gear members with the transmission housing or with another one of the planetary gear members, wherein said another one of the planetary gear members is connected to an output side of the input clutch.

The synchronizer-type coupling elements are selectively prepositioned for speed selection while the respective shaft is unloaded before the respective-input clutch is engaged to shift a load from a loaded axis to the unloaded axis. The input clutch on the loaded axis is disengaged as the input clutch on the unloaded axis is engaged to achieve clutch-to-clutch shifting between axes.

The input clutch on one of the axes may be identified as an input starting clutch which launches the vehicle from a stopped position, thereby eliminating the torque converter. This transmission may also be used with a torque converter.

By using synchronizers rather than clutches, cost and control complexity may, be reduced. In this configuration, the synchronizers and clutches on different axes would be common parts which would reduce design and manufacturing costs. The synchronizers are also easier to move than the clutch because a clutch requires significant hydraulics and multiple components for, shifting. The synchronizers are "on-off" clutches which are controlled electronically, manually or hydraulically. One-way clutches are not required to smooth the gear shifting because of the clutch-to-clutch shifting, but may be used if desired.

This transmission arrangement also provides significant flexibility. For example, whereas a dual clutch automated transmission cannot skip speeds, the present design can skip speeds (i.e., first-to-third, second-to-fourth, or third-to-fifth). Also, the direct-drive ratio may be provided in different gears, depending upon the configuration of the transmission.

The axes could be arranged such that the transfer gear associated with the second or third axis would engage the transfer gear of the first axis.

The above features, objects, aspects and advantages, as well as other features, objects, aspects and advantages of the invention are readily apparent from the following detailed description of the best mode for carrying out the invention when taken in connection with the accompanying drawings.

BRIEF DESCRIPTION OF THE DRAWINGS

FIGS. 3a and 3b show charts of two sample gear ratio progressions corresponding with the embodiment of FIGS. 1 and 2.

DESCRIPTION OF THE PREFERRED EMBODIMENT

Figure 1:
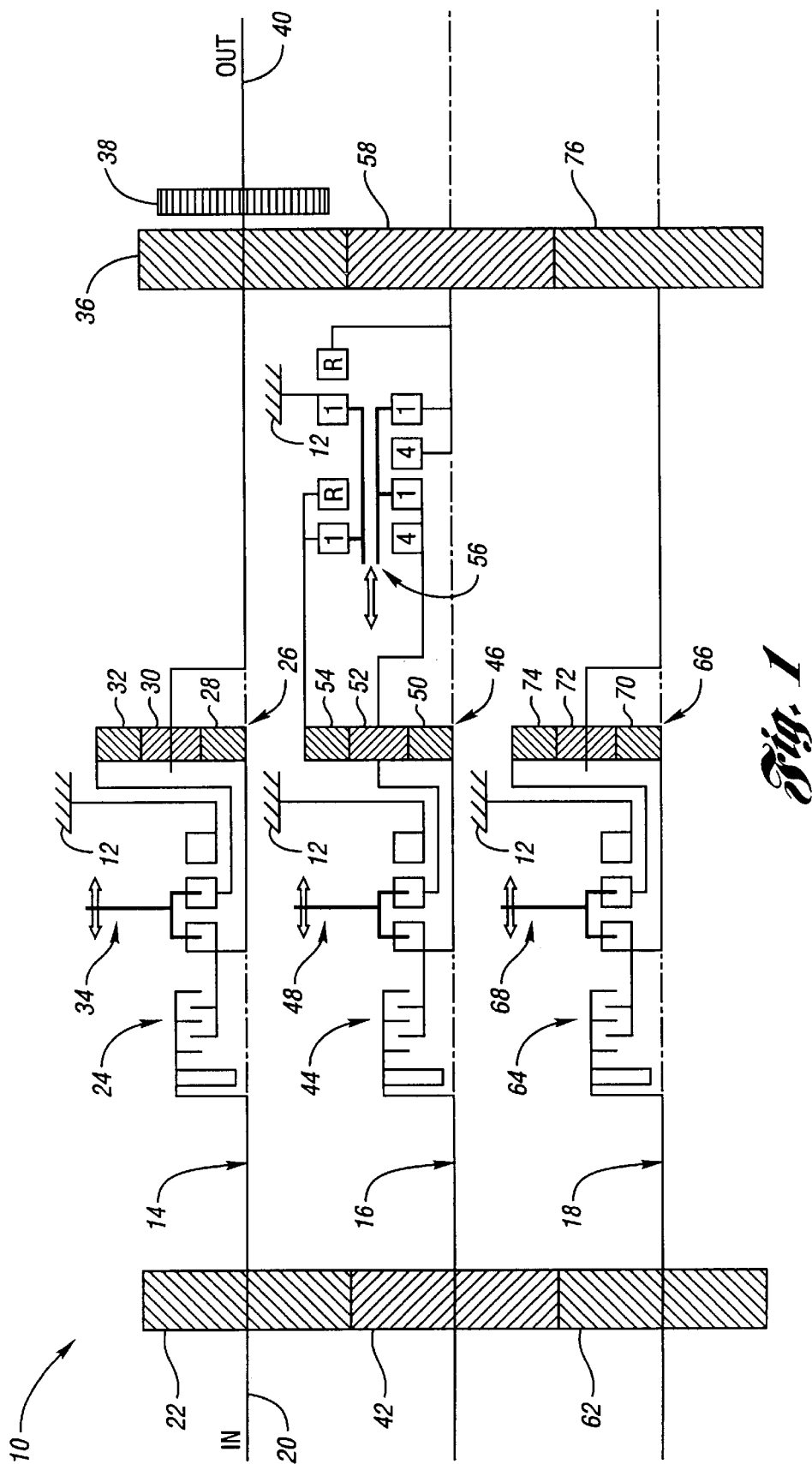
FIG. 1 shows a schematic stick diagram of a multiple axes planetary transmission in accordance with an embodiment of the invention.

FIG. 1 shows a schematic stick diagram of a multiple axes planetary transmission 10 in accordance with the present invention. The transmission 10 includes a transmission housing 12 with transmission axes 14,16,18 extending within the transmission housing 12.

Along the first axis 14, an input shaft 20 is connected to an input transfer gear 22. The input transfer gear 22 is engaged with an input clutch 24, and the input clutch 24 is connected to at least one member of the planetary gear set 26. The planetary gear set 26 includes a sun gear 28, a planet carrier assembly (pinion gear) 30, and a ring gear 32.

A synchronizer-type coupling element 34 is operatively connected between the input clutch 24 and the planetary gear set 26 for selectively engaging and disengaging the planetary gear set members 28,30,32 with respect to the input clutch 24 and the transmission housing 12.

An output transfer gear 36 is driven by the planet carrier assembly 30, and includes a parking gear 38 connected thereto, with an output shaft 40 connected to the parking gear 38 and output transfer gear 36.

Similarly, the transmission axis 16 includes a transfer gear 42 engaged with transfer gear 22, an input clutch 44 engaged with the planetary gear set 46, and a synchronizer-type coupling element 48 operatively connected between the input clutch 44 and the planetary gear set 46 for selectively engaging and disengaging planetary gear set members 50,52,54 with respect to the input clutch 44 and transmission housing 12 for gear shifting.

The transmission axis 16 also includes a reverse speed synchronizer 56 operatively connected between the planetary gear set 46 and the output transfer gear 58 for selectively reversing rotation of the output transfer gear 58 by moving the synchronizer 56 to the right, as viewed in FIG. 1, to operatively interconnect the boxes marked with an "R".

The third transmission axis 18 includes an input transfer gear 62 which is engaged with an input clutch 64. The input clutch 64 is connected to the planetary gear set 66, and a synchronizer-type coupling element 68 is operatively connected between the input clutch 64 and the planetary gear set 66 for selectively engaging and disengaging members 70,72, 74 with respect to the input clutch 64 and transmission housing 12 for gear changes. The planetary gear member (planet carrier assembly member) 72 is connected to the output transfer gear 76.

The ratio shifting sequence is such that one clutch is engaged to launch the vehicle, until the clutch is fully applied and the vehicle is moving. Subsequent gear shifts are achieved by prepositioning of the synchronizer on an unloaded axis and then the input clutches shifting load from the loaded axis to the unloaded axis. This sequencing continues for all upper gear states. The shifting cadence will include shifting to a new or previously used axis, using the axis's transfer gear set ratio and the axis's planetary gear ratio and synchronizer state to achieve an appropriate next gear ratio.

The transmission input shaft 20 is connected to both the input axis transfer gear 22 and the first input clutch 24. The transfer gear 22 drives secondary axes transfer gears 42 and 62. The second axis input clutch 44, in this example, is identified as the input starting clutch, which, when engaged, launches the vehicle from a stop. The torque continues through the preselected synchronizer 48 and to the planetary gear set 46, then through the forward/reverse synchronizer 56, through the output transfer gear 58 to output transfer gear 36, and finally to the transmission output shaft 40. The transmission 10 is now in its first gear condition, and the controls will preposition the synchronizer 34 for second gear. The input clutch 24 will engage during the shift as the input clutch 44 is controlled to go off, thus taking the active load path through the axis 14. The torque will continue through synchronizer 34, gear set 26, output transfer gear 36, and output shaft 40.

The synchronizer 68 will be prepositioned for the next gear state, and the controls will enable a clutch-to-clutch shift from the clutch 24 to clutch 64. The torque will then travel through synchronizer 68, planetary gear set 66, transfer gears 76,58,36, and to the output shaft 40.

The transmission 10 will continue to shift from axis-to-axis with a clutch-to-clutch shift to selectively load prepositioned, unloaded synchronizers. Each synchronizer 34,48,68 may require a neutral position to facilitate the shifting. The planetary gear sets 26,46,66 may be operated in an under-drive, direct-drive, or over-drive condition. Also, the transfer gears 22,36,42,58,62,76 may be operated in an under-drive, direct-drive, or over-drive condition, and be used to further enable usable gear ratios.

A reverse speed gear may be enabled by switching the forward/reverse synchronizer 56 to reverse the output torque direction from the planetary gear set 46. The parking gear 38 may be attached to any of the output transfer gears 36,58,76, or the output shaft 40. A one-way clutch may be included on any axis to enable a free-wheeler-to-clutch upshift.

The input shaft 20 and output shaft 40 may be placed at any of the axes 14,16,18 to establish a direct-drive through the transmission in various upper gears.

In the example shown, first gear is through axis 16 with gear set 46 in under-drive, second gear is through axis 14 with gear set 26 in under-drive, third gear is through axis 18 with gear set 66 in under-drive, and fourth gear is through axis 16 with gear set 46 in direct-drive and an under-drive ratio between input gears 22 and 42. The transmission direct drive is through axis 14 with gear set 26 in direct-drive and no gear reduction due to the axes transfer gears 20,36,42, 58,62,76. Sixth gear is through axis 18 with gear set 66 in over-drive, or an over-drive created with the axes transfer gears and gear set 66 in direct-drive. As previously mentioned, the reverse gear is enabled through axis 16 with synchronizer 56 reversing the output of gear set 46.

Figure 2:
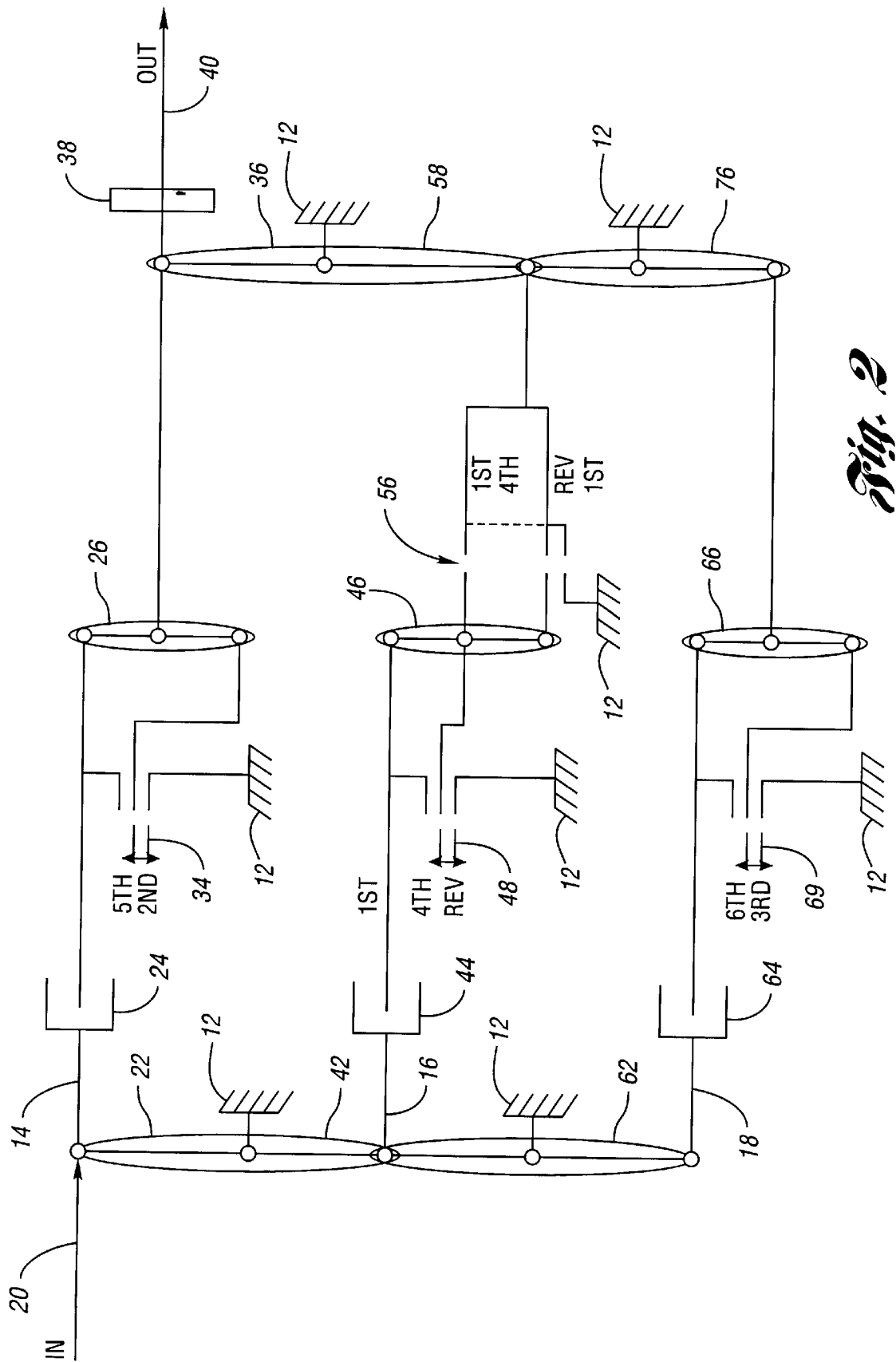
FIG. 2 shows a schematic lever diagram of the multiple axes planetary transmission of FIG. 1.

FIG. 2 provides a lever diagram of the multiple axis planetary transmission 10 shown in FIG. 1, with the same component numbering of FIG. 1. Also, FIGS. 3*a* and 3*b* show two sample gear ratio progressions for the multiple axis planetary transmission 10 of FIG. 1. As shown, the direct-drive ratio may be achieved in fourth or fifth gear.

While the best mode for carrying out the invention has been described in detail, those familiar with the art to which this invention relates will recognize various alternative designs and embodiments for practicing the invention within the scope of the appended claims.

What is claimed is:

1. A transmission arrangement for a vehicle comprising:
   a transmission housing;
   at least two transmission axes extending within the transmission housing; and
   wherein each of said axes includes an input transfer gear engaged with an input clutch, the input clutch being connected to at least one member of a planetary gear set, an output transfer gear driven by a member of the planetary gear set, and a synchronizer-type coupling element operatively connected between the input clutch and the planetary gear set for selectively engaging and disengaging members of the planetary gear set with respect to the input clutch and transmission housing.

2. The transmission arrangement of claim 1, wherein one of said transmission axes further comprises a reverse speed synchronizer operatively connected between the respective planetary gear set and output transfer gear for selectively reversing rotation of the respective output transfer gear.

3. The transmission arrangement of claim 1, wherein said transmission arrangement comprises a four-speed transmission having two of said axes.

4. The transmission arrangement of claim 1, wherein said transmission arrangement comprises a six-speed transmission having three of said transmission axes.

5. The transmission arrangement of claim 1, wherein said transmission arrangement comprises an eight-speed transmission having four of said transmission axes.

6. The transmission arrangement of claim 4, wherein said three transmission axes comprise a first axis having components configured to provide second and fifth forward speed ratios, a second axis having components configured to provide reverse, first and fourth forward speed ratios, and a third axis having components configured to provide third and sixth forward speed ratios.

7. The transmission arrangement of claim 1, wherein each said synchronizer-type coupling element is configured to selectively connect one of said planetary gear members with the transmission housing or with another one of said planetary gear members, wherein said another one is connected to an output side of the input clutch.

8. The transmission arrangement of claim 1, wherein said synchronizer-type coupling elements are selectively prepositioned for speed selection while the respective shaft is unloaded before the respective input clutch is engaged to shift a load from a loaded axis to the unloaded axis.

9. The transmission arrangement of claim 1, wherein an input clutch on one of said axes is an input starting clutch which launches the vehicle from a stopped position.

10. The transmission arrangement of claim 8, wherein said input clutch on the loaded axis is disengaged as the input clutch on the unloaded axis is engaged to achieve clutch-to-clutch shifting between axes.

11. A transmission arrangement for a vehicle comprising:
a transmission housing;
at least two transmission axes extending within the transmission housing;
wherein each of said axes includes an input transfer gear engaged with an input clutch, the input clutch being connected to at least one member of a planetary gear set, an output transfer gear driven by a member of the planetary gear set, and a synchronizer-type coupling element operatively connected between the input clutch and the planetary gear set for selectively engaging and disengaging members of the planetary gear set with respect to the input clutch and transmission housing; and
wherein one of said transmission axes further comprises a reverse speed synchronizer operatively connected between the respective planetary gear set and output transfer gear for selectively reversing rotation of the respective output transfer gear.

12. The transmission arrangement of claim 11, wherein said transmission arrangement comprises a four-speed transmission having two of said axes.

13. The transmission arrangement of claim 11, wherein said transmission arrangement comprises a six-speed transmission having three of said transmission axes.

14. The transmission arrangement of claim 11, wherein said transmission arrangement comprises an eight-speed transmission having four of said transmission axes.

15. The transmission arrangement of claim 13, wherein said three transmission axes comprise a first axis having components configured to provide second and fifth forward speed ratios, a second axis having components configured to provide reverse, first and fourth forward speed ratios, and a third axis having components configured to provide third and sixth forward speed ratios.

16. The transmission arrangement of claim 11, wherein each said synchronizer-type coupling element is configured to selectively connect one of said planetary gear members with the transmission housing or with another one of said planetary gear members, wherein said another one is connected to an output side of the input clutch.

17. The transmission arrangement of claim 11, wherein said synchronizer-type coupling elements are selectively prepositioned for speed selection while the respective shaft is unloaded before the respective input clutch is engaged to shift a load from a loaded axis to the unloaded axis.

18. The transmission arrangement of claim 11, wherein an input clutch on one of said axes is an input starting clutch which launches the vehicle from a stopped position.

19. The transmission arrangement of claim 17, wherein said input clutch on the loaded axis is disengaged as the input clutch on the unloaded axis is engaged to achieve clutch-to-clutch shifting between axes.

20. A six-speed transmission for a vehicle comprising:
a transmission housing;
a first transmission axis including a first input transfer gear engaged with a first input clutch which is connected to at least one member of a first planetary gear set, a first output transfer gear driven by a member of the first planetary gear set, and a first synchronizer-type coupling element operatively connected between the first input clutch and the first planetary gear set for selectively engaging and disengaging members of the first planetary gear set with respect to the first input clutch and the transmission housing;
a second transmission axis extending within the transmission housing including a second input transfer gear engaged with a second input clutch which is connected to at least one member of a second planetary gear set, a second output transfer gear driven by a member of the second planetary gear set, and a second synchronizer-type coupling element operatively connected between the second input clutch and the second planetary gear set for selectively engaging and disengaging members of the second planetary gear set with respect to the second input clutch and transmission housing, and a reverse speed synchronizer operatively connected between the second planetary gear set and the second output transfer gear for selectively reversing rotation of the second output transfer gear; and
a third transmission axis extending within the transmission housing including a third input transfer gear engaged with a third input clutch which is connected to at least one member of a third planetary gear set, a third output transfer gear driven by a member of the third planetary gear set, and a third synchronizer-type coupling element operatively connected between the third input clutch and the third planetary gear set for selectively engaging and disengaging members of the third planetary gear set with respect to the third input clutch and transmission housing.

* * * * *